No. 875,134. PATENTED DEC. 31, 1907.
W. THORN & M. F. MANN.
AUTOMATIC COUPLING FOR RAILWAY VEHICLES.
APPLICATION FILED JAN. 28, 1907.
3 SHEETS—SHEET 1.
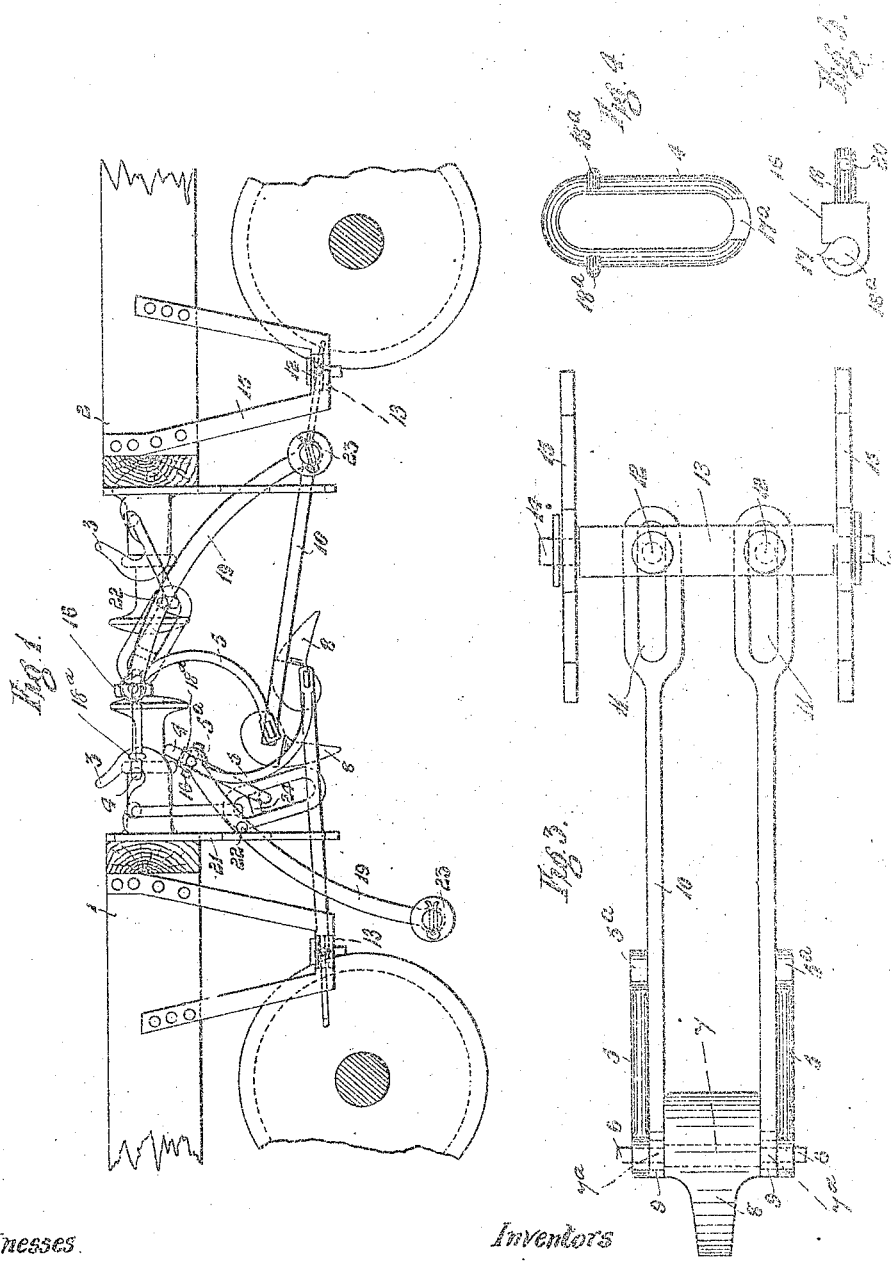
Witnesses
Inventors
William Thorn and Marcus F. Mann.
by
Atty No. 875,134. PATENTED DEC. 31, 1907.
W. THORN & M. F. MANN.
AUTOMATIC COUPLING FOR RAILWAY VEHICLES.
APPLICATION FILED JAN. 28, 1907.
3 SHEETS—SHEET 2.
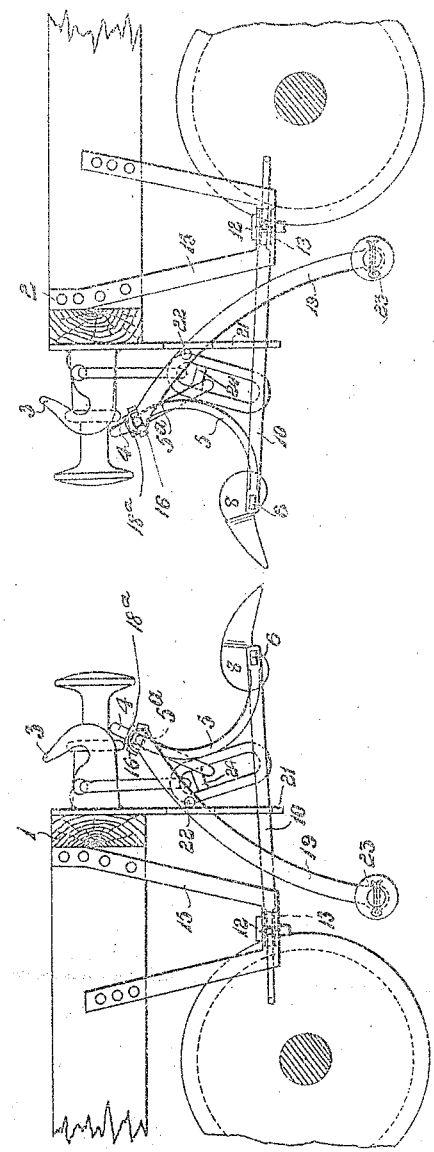
Witnesses
Inventors
William Thorn and Marcus F. Mann.
by
Attorney.

No. 875,134. PATENTED DEC. 31, 1907.
W. THORN & M. F. MANN.
AUTOMATIC COUPLING FOR RAILWAY VEHICLES.
APPLICATION FILED JAN. 28, 1907.
3 SHEETS—SHEET 3.
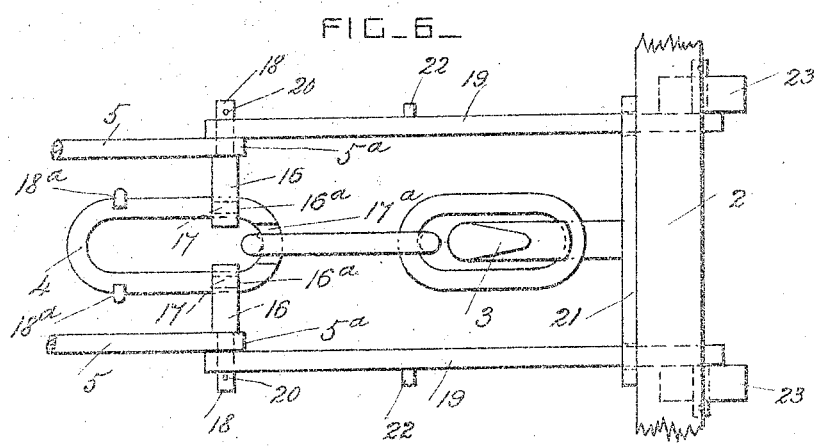
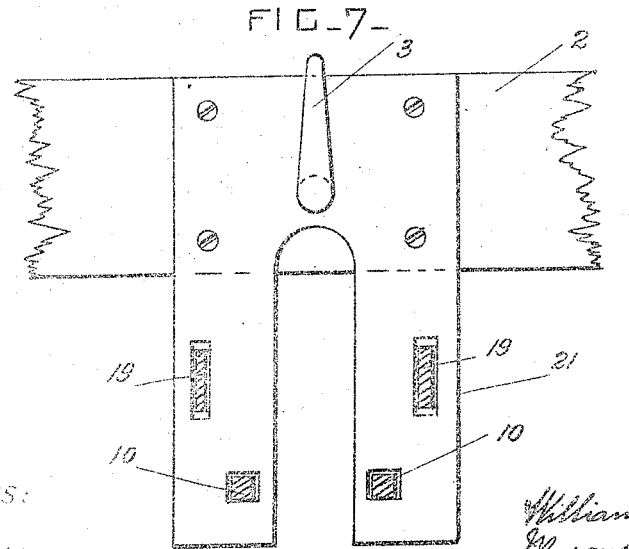
WITNESSES:
W. E. Allen
A. Wagner
INVENTORS
William Thorn, and
Marcus F. Mann.
BY
Herbert W. J. Jenner.
Attorney

UNITED STATES PATENT OFFICE.

WILLIAM THORN AND MARCUS FREDERICK MANN, OF EXETER, ENGLAND.

AUTOMATIC COUPLING FOR RAILWAY-VEHICLES.

No. 875,134.                Specification of Letters Patent.        Patented Dec. 31, 1907.

Application filed January 28, 1907. Serial No. 354,548.

*To all whom it may concern:*

Be it known that we, WILLIAM THORN and MARCUS FREDERICK MANN, subjects of the King of Great Britain and Ireland, residing at Exeter, in the county of Devon, England, (whose post-office addresses, respectively, are 1 Parr street and Farleigh House, both in Exeter, in the county of Devon, England,) have invented certain new and useful Improvements in Automatic Couplings for Railway-Vehicles and the Like; and we do hereby declare the following to be a full, clear, and exact description of the invention, such as will enable others skilled in the art to which it appertains to make and use the same.

This invention relates to improvements in automatic couplings for railway vehicles and the like and consists principally of an automatic coupling in which coupling chains and hooks the same (or substantially the same) as now generally in use with the ordinary non-automatic couplings are employed, and also the draw gear as now in use may be employed, the action with this invention being that as the vehicles come together for the purpose of coupling the couplers contact with each other and consequently one or the other of the couplers is actuated so as to lift or move the coupling chain of one vehicle with its coupling link into engagement with the coupling hook on the other vehicle, the outer ends of the coupling chains being carried by the coupler.

The accompanying drawings illustrate a method of carrying out the invention.

Figure 1 is a side elevation of part of the end portions of two adjacent trucks or vehicles with the automatic couplers according to this invention, one of the couplers being in the actuated position, i. e. the vehicles being coupled together. Fig. 2 is a similar view to Fig. 1 but shows the vehicles uncoupled. Fig. 3 is a plan view of part of the automatic coupler as hereinafter described. Fig. 4 is a plan view of the end link of the ordinary coupling chain. Fig. 5 shows one of the swivel supports for the end link of the coupling chain as hereinafter described. Fig. 6 is a detail plan view of one hook and its coupling links, showing the means for supporting the outer link, and drawn to a larger scale. Fig. 7 is a front view of one of the guide-plates.

Like reference numbers indicate corresponding parts in the several figures of the drawings.

Referring to the drawings, 1 and 2 are the portions of the ends of two adjacent vehicles which are provided with the usual coupling or draw hooks 3. Inasmuch as the automatic coupler of each vehicle is similar it will only be necessary to describe in detail the coupler of one vehicle, and we will therefore describe the coupler of the right hand vehicle No. 2 which is shown in the position in which it has been operated so as to engage the outer link of the coupling chain of this vehicle with the draw hook of the left hand vehicle No. 1.

The outer link 4 of the ordinary three-link coupling chain is, in the example shown, pivotally mounted on the upper ends of a pair of curved supports or arms 5, 5 whose lower ends are mounted on or engage the rectangular reduced ends 6, 6 of a rectangular shaft or cross-bar 7 on which latter is mounted a curved block or cam 8; the pivots $7^a$ of the outer reduced ends 6 of shaft 7 between the curved arms 5 and the cam 8 are circular and work in the outer slotted ends 9, 9 of the bars or rods 10, 10 (Fig. 3), the inner or right hand ends of the bars 10 being also provided with slots 11, 11 which are adapted to work about pins or bolts 12, 12 in a frame 13 which latter is provided with pivots 14, 14 these latter pivots working in holes or bearings in the brackets or hangers 15, 15 suitably secured to the vehicle frame. The outer link 4 of the coupling chain is pivotally mounted on the upper ends of the curved arms 5 by means of swivels 16 (see Fig. 5) one of which is provided on each side of the link 4; the jaw $16^a$ of the swivel, which is adapted to engage the side of the link 4, is formed as shown with a narrow opening 17 adapted to slip over a reduced or flattened part $17^a$ of the link 4 and when so slipped over, the circular part of the jaw $16^a$ can engage the side of the link 4. The swivels are thus capable of longitudinal movement on the side of the links as will be clear from Fig. 1 where it will be seen that the swivel 16 of the link 4 of the coupling chain on the right hand vehicle No. 2 is at the inner end of the said link while the swivel 16 of the link 4 belonging to the left hand vehicle No. 1 is up against the stops (hereinafter described) adjacent to the outer ends of this last mentioned link.

18ª, 18ª (see Fig. 4) are stops or projections formed or provided on the link 4, adjacent to its outer end, for the purpose of limiting the longitudinal movement of the swivels 16 on the side of the link 4 i. e. towards the outer end of the curved link. Each of the swivels 16 is provided with a spindle or pivot 18, and the upper ends 5ª, 5ª (Fig. 3) of the curved arms 5 are provided with eyes or pivot holes so as to operatively engage the pivots 18; these upper ends of the arms 5 engage the inner ends of the pivots 18, adjacent to the swivel jaw 16ª and on the outer ends of each of the pivots 18 is mounted a curved arm 19 the upper ends of these curved arms being also provided with eyes or pivot holes adapted to engage the pivots 18.

When the upper ends of the arms 5 and 19 have been threaded on to their respective pivots 18 they may be retained therein by means of split pins or cotters, a pin hole 20 (Fig. 5) being provided through each of the pivots 18. Each of the curved arms or bars 19 works through a slot (shown by dotted lines in Fig. 1) in a plate or bracket 21 forming a guide fixed to the buffer bar, or otherwise conveniently arranged, and each of the said arms or bars 19 is provided with a laterally projecting pin or stop 22 (or pins or stops) adapted to limit the rearward or downward movement of the said arms, by the pins coming in contact with the brackets or guide plate 21, and thus to retain the outer link 4 in proper position when the vehicles are uncoupled.

It will be understood that the coupler of each vehicle has two arms 19 each of which, in the example shown, engages the end of the respective pivot 18 outside the arms 5, 5, Fig. 3. Each of these arms 19 may be provided at its lower end with a suitable weight 23 to insure the parts returning to their proper normal position when the vehicles are uncoupled. The rods or bars 10, 10 hereinbefore described, also work through the bracket or guide plate 21 which may be provided with suitable slots or guideways for the purpose. The guide plates 21 may be in the form of U shaped brackets with slots in the side arms for the bars 10 to work through.

The intermediate link of the coupling chain of each vehicle may be provided with a crossbar 24 to insure that the links assume the proper free position when the vehicles are uncoupled.

The working according to the example shown is as follows:—Assuming the vehicles Nos. 1 and 2 to be uncoupled as shown in Fig. 2, the couplers of each vehicle being then in the position shown, and that it is desired to couple the vehicles, one of them, for instance vehicle No. 2, is moved up to vehicle No. 1. In this movement the blocks or cams 8 will come in contact with each other and the cams will both be turned to an approximately vertical position. One cam will then ride over the other according to the relative positions of the cams as controlled by the road-bed or other natural cause. In the example shown the cam 8 of vehicle No. 2 will be tilted downwards or towards a vertical position so that its upper curved surface will ride up or slide on the upper curved surface of the cam of vehicle No. 1 and 2, through the angular pivots or ends 6 of the shaft 7 on which the said cam 8 is mounted, the curved arms 5 will be turned or moved forward and upward thus lifting the outer link 4 up onto the draw hook 3 of vehicle No. 1 thus coupling the two vehicles together, the cam 8 of vehicle No. 2 having then passed over or to the rear of the cam or vehicle No. 1 which latter cam is then in its normal position as shown in Fig. 1. The arms 19 of the coupler of vehicle No. 2 will of course, by the action just described, be moved to the position shown in Fig. 1 owing to the upper ends of these arms being connected to the pivots 18 of the swivel 16 by which the link 4 is supported on the curved arms or supports 5, 5.

When the link 4 of the coupling chain of vehicle No. 2 is again disengaged from the draw hook of vehicle No. 1, so as to uncouple the vehicles (which may be done in any known or convenient manner), the coupler of vehicle No. 2 will automatically return to the normal or uncoupled position shown in Fig. 2, the weights 23 on the lower ends of the bars 19 insuring or assisting the return of the parts to the normal position.

It will be seen that with this invention the coupling of the vehicles together is purely automatic and is effected simply by the movement of one vehicle up to the other, no previous adjustment of the couplers by hand being necessary.

The slots in the outer or left hand ends of the bars 10 are provided for the purpose of facilitating coupling of the vehicles on a curve. By means of these slots it will be seen that if the vehicles are on a curve and the blocks or cams 8 consequently not in a direct line with one another or in such position that they will not meet one another squarely end to end but will come in contact at one or other of their edges a turning movement of the cams 8 and link supports 5, 5 can take place thus providing the necessary adjustment for coupling on a curve.

What we claim as our invention and desire to secure by Letters Patent is:—

1. In a car coupling, the combination, with two cars each provided with a coupling-chain and a coupling-hook; of jointed arms pivotally connected with the said cars and normally supporting the said links in an uncoupled position, and cams carried by the said arms at their joints and operating automatically to place the coupling-chain of one car in engagement with the coupling-hook of the other car when the said cars are moved together.

2. In a car coupling, the combination, with two cars each provided with a coupling-chain and a coupling-hook; of guide-plates secured to the said cars, arms 10 pivotally connected with the said cars and slidable in the said guide-plates, arms 5 pivoted to the said arms 10 and normally supporting the said links in an uncoupled position, and cams connected with the said arms 5 and operating automatically to place the coupling-chain of one car in engagement with the coupling-hook of the other car when the said cars are moved together.

3. In a car coupling, the combination, with two cars each provided with a coupling-chain and a coupling-hook; of guide-plates secured to the said cars, arms 10 pivotally connected with the said cars and slidable in the said guide-plates, arms 5 pivoted to the said arms 10 and normally supporting the said links in an uncoupled position, weighted arms 19 connected to the said arms 5 and slidable in the said guide-plates and operating to retract the said chains automatically when disengaged from the said hooks, and cams connected with the said arms 5 and operating automatically to place the coupling-chain of one car in engagement with the coupling-hook of the other car when the said cars are moved together.

4. In a car coupling, the combination, with two cars each provided with a coupling-chain and a coupling-hook; of jointed arms pivotally connected with the said cars and normally supporting the said links in an uncoupled position, uncoupling-poles pivoted to the said cars for uncoupling the said chains from the said hooks, weighted arms for retracting the said chains when uncoupled by the said poles, and cams carried by the said arms at their joints and operating automatically to place the coupling-chain of one car in engagement with the coupling-hook of the other car when the said cars are moved together.

5. In a car coupling, the combination, with two cars each provided with a coupling-chain and a coupling-hook; of jointed arms pivotally connected with the said cars, swivels pivoted to the free end portions of the said arms and slidable longitudinally on the end links of the said chains, and cams carried by the said arms at their joints and operating automatically to place the coupling-chain of one car in engagement with the coupling-hook of the other car when the said cars are moved together.

6. In a car coupling, the combination, with two cars each provided with a coupling-chain and a coupling-hook; of supporting mechanism connected with each said car and normally holding the links of the said coupling-chains in an uncoupled position, and opposed cams carried by the said supporting mechanisms and operating to place the coupling-chain of one car in engagement with the coupling-hook of the other car when the said cars are moved together.

In testimony whereof we affix our signatures, in presence of two witnesses.

WILLIAM THORN.
MARCUS FREDERICK MANN.

Witnesses:
FRANK BAILEY,
EDGAR M. MANN.